(12) United States Patent  (10) Patent No.: US 7,210,738 B1
Mahaffy  (45) Date of Patent: May 1, 2007

(54) RETRACTABLE SEAT BACK PROTECTOR

(75) Inventor: Jennifer Mahaffy, Tipton, MI (US)

(73) Assignee: Toyota Technical Center, USA, Inc., Ann Arbor, MI (US)

( * ) Notice: Subject to any disclaimer, the term of this patent is extended or adjusted under 35 U.S.C. 154(b) by 0 days.

(21) Appl. No.: 11/402,680

(22) Filed: Apr. 12, 2006

(51) Int. Cl.
B60N 2/60 (2006.01)
(52) U.S. Cl. .............................. 297/184.1; 297/219.1; 297/463.2
(58) Field of Classification Search ............ 297/184.1, 297/184.11, 219.1, 463.2
See application file for complete search history.

(56) References Cited

U.S. PATENT DOCUMENTS

| 1,985,222 | A | * | 12/1934 | Menhall | 297/223 |
| 4,118,066 | A | * | 10/1978 | Ricke | 297/184.11 |
| 4,320,922 | A | * | 3/1982 | Meritis | 297/220 |
| 4,600,238 | A | * | 7/1986 | Goodford | 297/219.1 |
| 4,790,592 | A | * | 12/1988 | Busso et al. | 297/184.11 |
| 5,330,251 | A | * | 7/1994 | McGuire | 297/229 |
| 6,158,805 | A | * | 12/2000 | Blaney | 297/184.11 |
| 6,382,720 | B1 | * | 5/2002 | Franklin et al. | 297/228.13 |
| 6,637,815 | B1 | * | 10/2003 | Louque et al. | 297/184.11 |

FOREIGN PATENT DOCUMENTS

JP  4-34956  3/1992
JP  8-216755  8/1996

* cited by examiner

Primary Examiner—Peter R. Brown
(74) Attorney, Agent, or Firm—Gifford, Krass, Sprinkle, Anderson & Citkowski, P.C.

(57) ABSTRACT

A retractable seat back protector is provided for a motor vehicle seat. The protector includes a retractable roller with a first end of a flexible sheet fixedly attached thereto. A second end of the sheet is pulled in a direction away from the roller such that the sheet covers the seat back when the protector is in the extended position. The second end may have at least one fastener that allows the second end of sheet to be attached to the seat back. The protector is mounted onto the seat back proximal to a head rest area or a floorboard area, or may be mounted within the seat back or underneath the seat.

11 Claims, 3 Drawing Sheets

RETRACTABLE SEAT BACK PROTECTOR

FIELD OF THE INVENTION

The present invention relates to a seat protector, in particular to a retractable seat back protector.

BACKGROUND OF THE INVENTION

In order to increase the safety to children while traveling in a motor vehicle, child safety seats are typically placed in the rear seat of an automobile. When a child is placed in the child safety seat, the seat elevates and places the child closer to the back of the seat in front of him/her allowing the child to reach the back of the seat with their feet or hands or with other markable items. It is not uncommon for a child placed in a child safety seat to kick, throw things or spill a liquid or some type of food onto the back of the seat in front of him/her. These actions can result in the soiling and staining of the seat back in front of the child.

In order to prevent damage to the seat back in front of a child, a variety of items can be placed over the seat back to protect it. For example, a towel can be anchored by pinching one of the towel edges between the headrest and the seat, thus allowing the towel to fall down in front of the seat back. However, due to the erratic movements of the child and a child's natural tendency to grab items in its surrounding, a towel will fall down to the floorboard area and not provide a suitable solution. Also, items purchased that hang on the back of a seat and contain a pocket for travel items, toys, etc., are typically ripped or destroyed due to the child's erratic movements and attempts to pull said items off of the seat in front of him/her.

Prior art has attempted to protect seat surfaces by either placing a cover over the front of a seat or to attach a piece of cloth onto the back of the seat. However, neither method provides for adequate and convenient protection of a seat back when a child is placed in a child safety seat behind the front seats.

SUMMARY OF THE INVENTION

A retractable seat back protector is provided for a motor vehicle seat. The protector includes a retractable roller with a first end of a flexible sheet fixedly attached thereto. A second end of the sheet is pulled in a direction away from the roller such that the sheet covers the seat back when the protector is in the extended position. The second end may have at least one fastener that allows the second end of sheet to be attached to the seat back. In addition, the edges of the sheet may have at least one fastener to allow the edges to be attached to the seat back.

The protector is mounted onto the seat back proximal to a head rest area or a floorboard area. In the alternative, the protector is mounted within the seat or underneath the seat. Depending on where the protector is mounted, the second end of the sheet attaches to the area oppositely deposed therefrom such that the sheet covers the seat back.

DETAILED DESCRIPTION OF THE INVENTION

Figure 1:
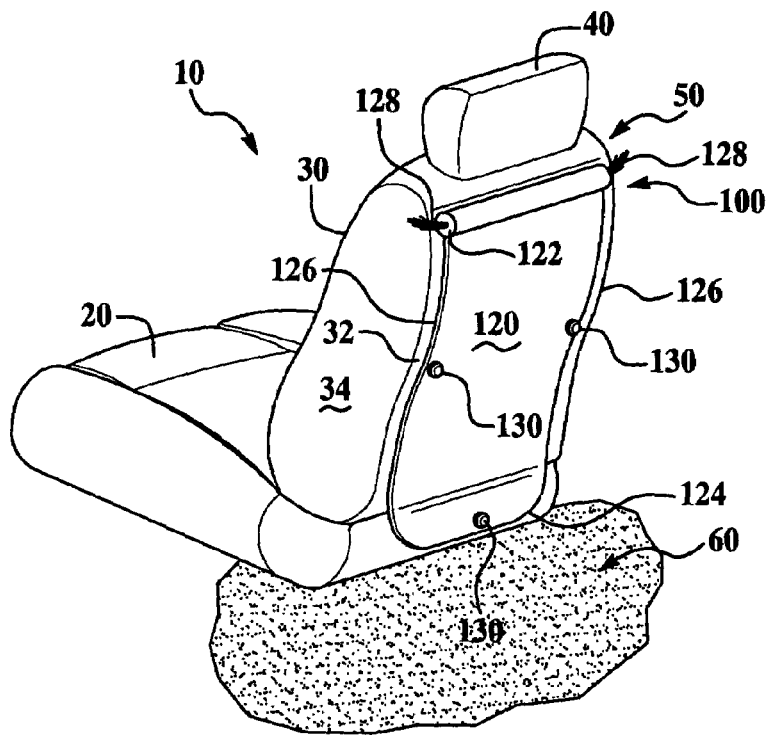
FIG. 1 shows a retractable seat back protector attached to the headrest area in the extended position.

In accordance with the invention, retractable seat back protector 100 is mounted to a motor vehicle seat 10 proximal to a headrest area 50 (See FIG. 1). The protector 100 is suitable for protecting a back portion 32 of a typical motor vehicle seat 10. The vehicle seat also has a bottom portion 20, a top portion 30, two side portions 34, a back portion 32, and a headrest 40. The back portion 32 may include the rearward end of bottom portion 20 in addition to the rearward side of top portion 30. The protector 100 is attached proximal to the headrest 40 in a headrest area 50 using attachment device 128. Attachment device 128 may consist of bracket arms, Velcro strips or any suitable means known to one with skill in the art.

The protector 100 has a flexible sheet 120 with a first end 122, a second end 124, and two side edges 126. Sheet 120 is preferably made from plastic. Less preferably, sheet 120 can be made from cloth, paper, leather or fiberglass. Attached to the second end 124 of the sheet 120 is a fastener 130. The fastener 130 at the second end 124 affords for the flexible sheet 120 to be attached to the seat back 32 proximal to a floorboard area 60. As depicted in FIG. 1, fasteners 130 are attached to both side edges 126, thereby affording for the attachment of the side edges 126 to the seat back 32 proximal to the side portions 34 of seat 10. In the alternative, the side edges 126 may have more than one fastener 130 on each edge or no fasteners 130 on each edge. In addition, the second end 124 may have more than one fastener 130 attached thereto. Also shown in FIG. 1, the sheet 120 is adjacent to the back portion 32 when said sheet is attached to said back portion with at least one fastener 130.

Figure 2:
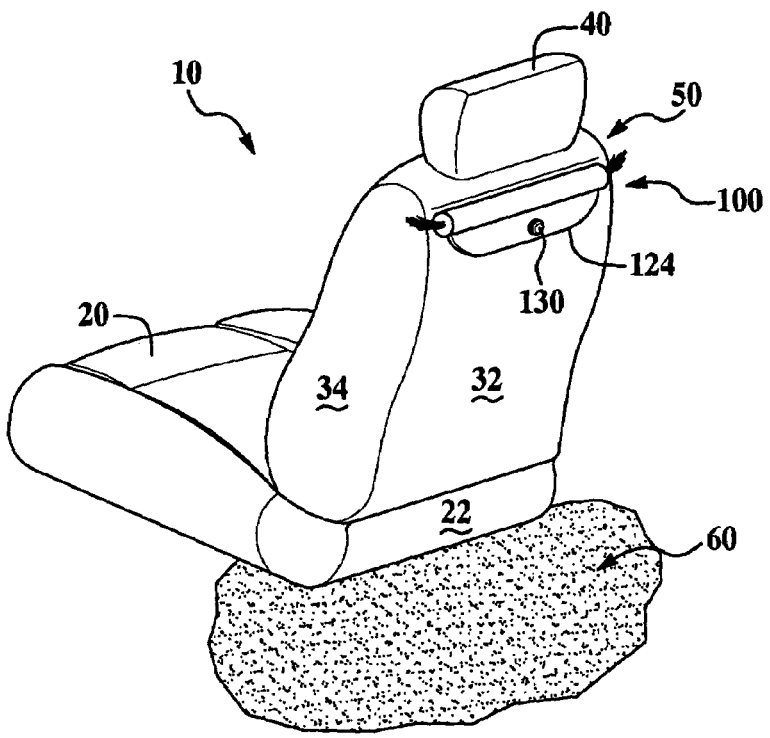
FIG. 2 shows a retractable seat back protector attached to the headrest area in the retracted position.

FIG. 2 shows the protector 100 in the retractable position. In the retractable position the sheet 120 is conveniently stored out of the view from a passenger located in the back seat. However, while the retractable seat back protector 100 is in the retractable position, the seat back 32 is unprotected from the soiling and spilling that may occur from the erratic movements of a child placed in a child safety seat behind motor vehicle seat 10.

Figure 3:
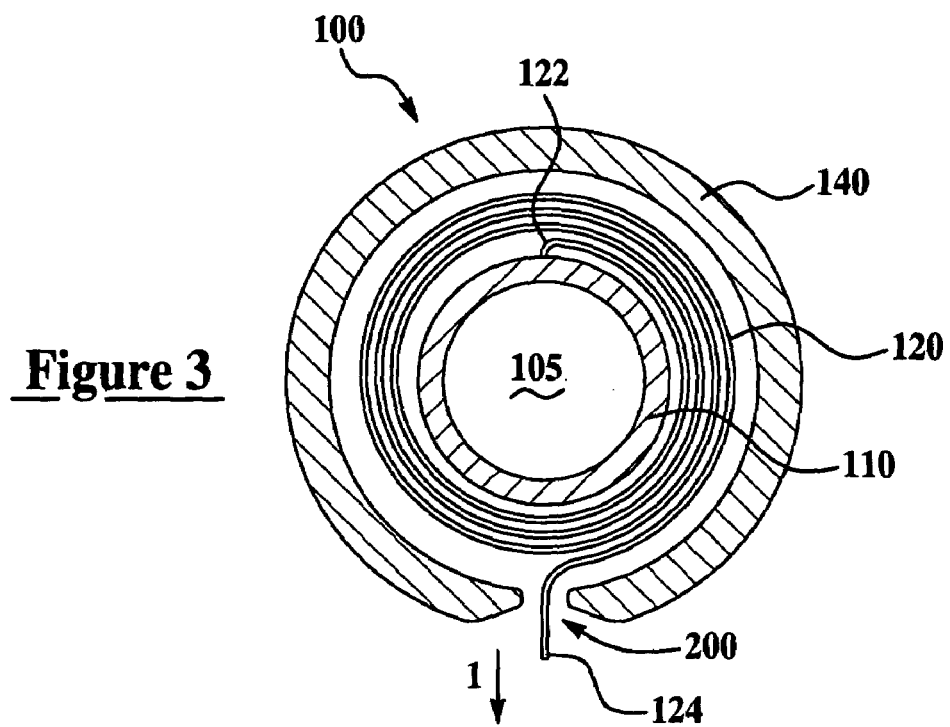
FIG. 3 shows a cross-sectional view of a retractable seat back protector.

FIG. 3 shows a cross-sectional view of the protector 100. A roller 110 has the first end 122 of the sheet 120 fixedly attached thereto. Exterior to the roller 110 and the sheet 120 is a cover 140. In the alternative, the protector 100 does not have the cover 140. The cover 140 has a slot 200 which affords for the second end 124 of flexible sheet 120 to pass therethrough. Upon exerting a force to the second end 124 in a general first direction 1, the protector 100 is transformed from the retractable position shown in FIG. 2 to the extended position shown in FIG. 1. Within internal space 105 of roller 110 a spring mechanism (not shown) is located for the purpose of aiding in retracting the sheet 120 from the extended position shown in FIG. 1 to the retracted position shown in FIG. 2. In addition to a spring mechanism, any method or device that affords for the retracting of flexible sheet 120 around roller 110 can be used. For example, a lever arm (not shown) can be attached to roller 110 and used to roll flexible sheet 120 onto roller 110.

Figure 4:
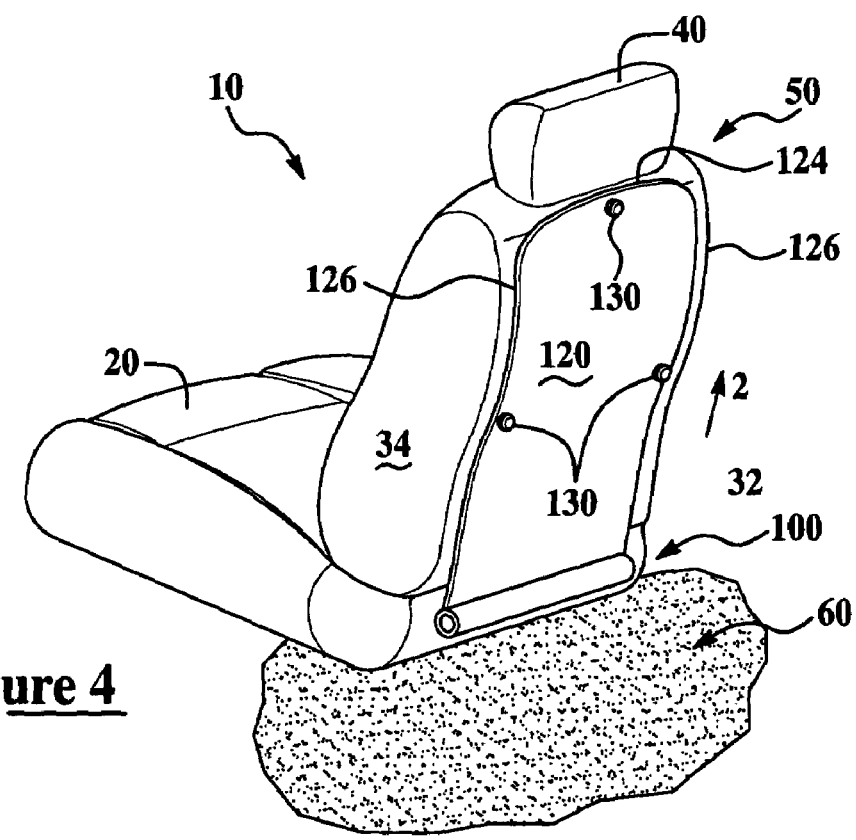
FIG. 4 shows a retractable seat back protector attached to the floorboard area in the extended position.

FIG. 4 shows a retractable seat back protector attached to the seat back 32 of seat 10 proximal to a floorboard area 60. In this embodiment a force is applied to the second end 124 of the sheet 120 in a general second direction 2 such that fastener 130 at second end 124 can be attached to the seat back 32 proximal to the headrest 40 at headrest area 50. Similar to FIG. 1, the embodiment shown in FIG. 4 may have fasteners 130 attached to side edges 126 which afford for the sheet 120 to be adjacent and attached to seat back 32 proximal to side portions 34. Although shown in the extended position in FIG. 4, the sheet 120 can be retracted and rolled onto roller 110 such that the retractable seat back protector 100 is in the retracted position (not shown).

Figure 5:
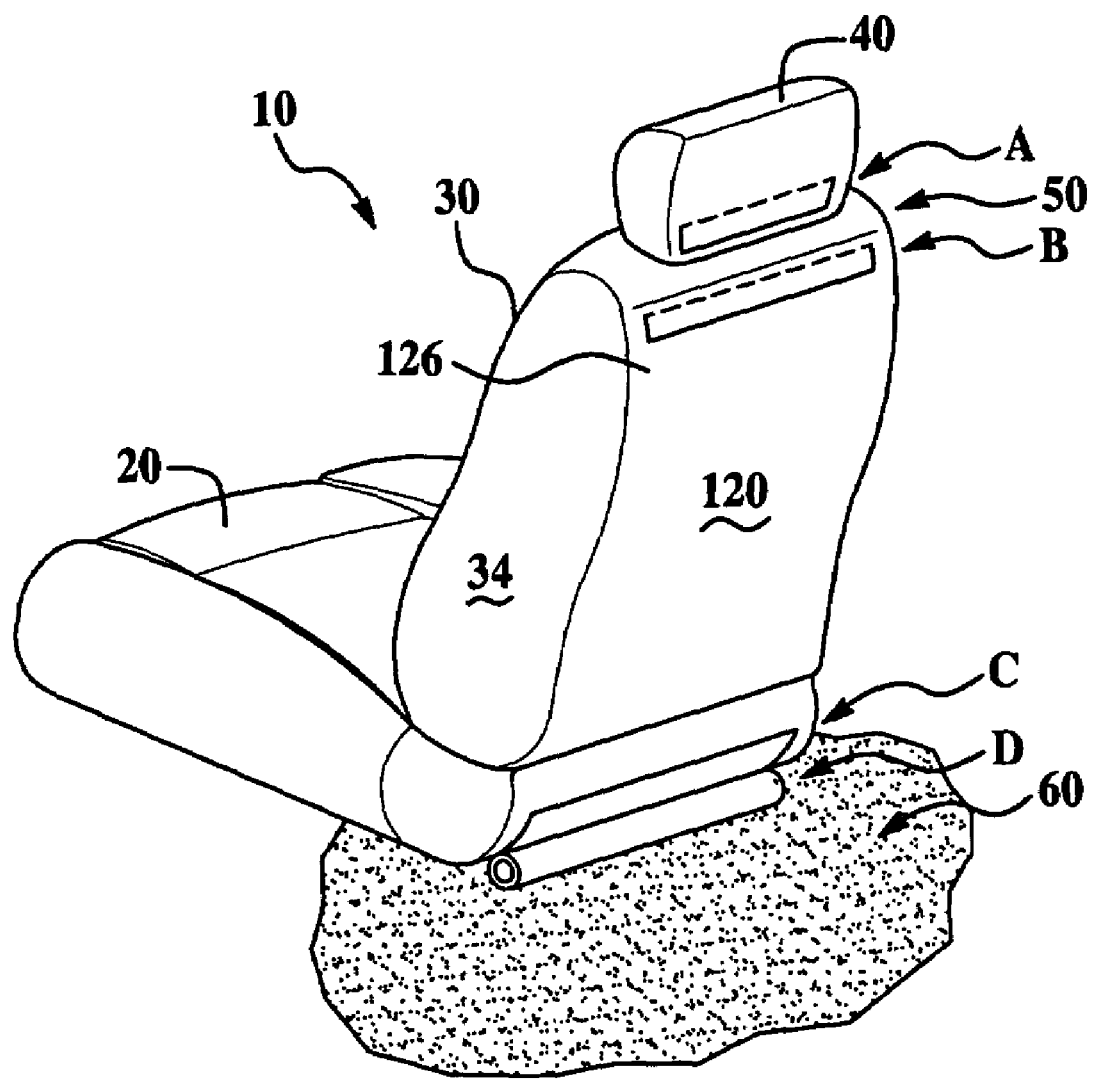
FIG. 5 shows alternative locations for the placement of a retractable seat back protector.

Turning now to FIG. 5, locations A, B, C and D on motor vehicle seat 10 show different locations where the protector 100 may be placed in addition to those shown in FIGS. 1, 2 and 4. Location A places the protector 100 within the headrest 40. Location B places the protector 100 within the top portion 30 of motor vehicle seat 10 at a location proximal to the headrest area 50. Location C places the protector 100 within the bottom portion 20 of the seat back 32. Attaching or positioning the protector 100 at locations A, B or C locates it out of view from a passenger seated behind motor vehicle seat 10 when the seat protector is not in use. Finally, location D places the protector 100 underneath the motor vehicle seat 10 in a location proximal to the floorboard area 60. These locations have been shown for illustrative purposes only and the protector 100 may be placed in a variety of other locations affording for the protection of the seat back 32 of motor vehicle seat 10.

The invention is not restricted to the illustrative examples described above. The examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

The invention claimed is:

1. A retractable seat back protector which is secured to a motor vehicle seat having a generally horizontally oriented bottom portion and a generally vertically oriented backrest portion, the backrest having a front surface and a rear surface comprising:
   a retractable roller mounted on an upper portion of the rear surface of the backrest, said roller having a flexible sheet that is movable between a rolled up position and an extended position, wherein said sheet has a first upper end and a second lower end and said first upper end is permanently attached to said roller such that said sheet is adjacent to and covers the rear surface of the backrest when in the extended position and said lower second end is detachably secured to a lower portion of the rear surface of the backrest of the seat.

2. The invention claimed in claim 1 wherein said second lower end of said sheet has at least one fastener.

3. The invention claimed in claim 1 wherein said flexible sheet is made from plastic.

4. The invention claimed in claim 1 further comprising two side edges connecting said first upper end and said second lower end of said sheet.

5. The invention claimed in claim 4 wherein each edge of said two side edges has at least one fastener.

6. The invention claimed in claim 1 wherein said protector is mounted within the upper portion of the motor vehicle backrest.

7. A retractable seat back protector which is secured to a motor vehicle seat having a generally horizontally oriented bottom portion and a generally vertically oriented backrest portion, the backrest having a front surface and a rear surface comprising:
   a retractable roller mounted onto a lower portion of the rear surface of the backrest, said roller having a flexible sheet that is movable between a rolled up position and an extended position, wherein said sheet has a first lower end, a second upper end and two side edges joining said first lower end and said second upper end, and said first lower end is permanently attached to said retractable roller such that said sheet is adjacent to and covers the rear surface of the backrest when in the extended position and said second upper end is detachably secured to an upper portion of the rear surface of the backrest.

8. The invention claimed in claim 7 wherein said flexible sheet is made from plastic.

9. The invention claimed in claim 7 wherein each edge of said two side edges has at least one fastener.

10. The invention claimed in claim 7 wherein said retractable seat back protector is mounted under the motor vehicle seat.

11. The invention claimed in claim 7 wherein said retractable seat back protector is mounted within the lower portion of the backrest of the motor vehicle seat.

* * * * *